Sept. 23, 1952  B. ABOLTIN  2,611,723
FILM SPLICER
Filed Dec. 13, 1949  2 SHEETS—SHEET 1
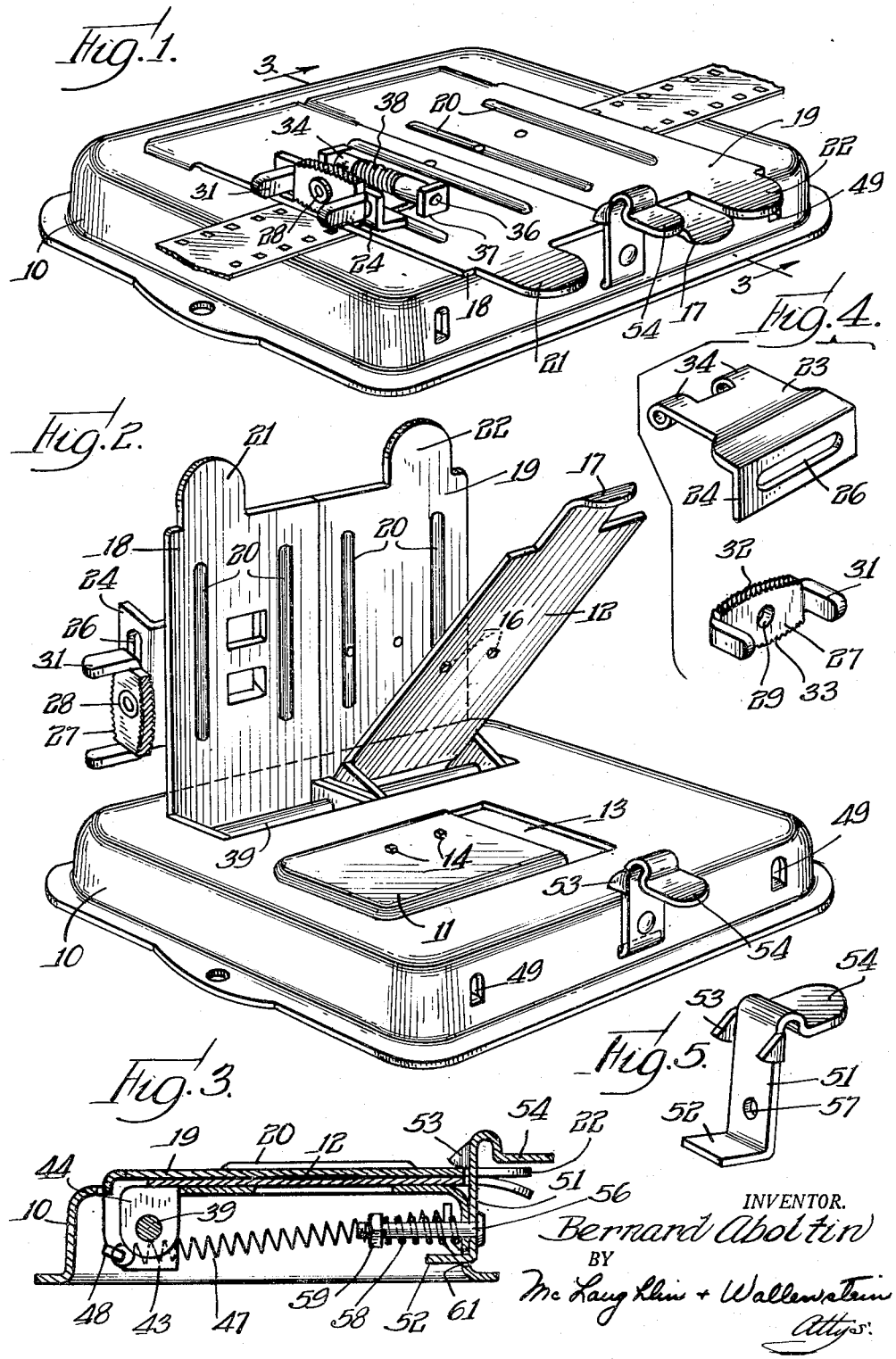
INVENTOR.
Bernard Aboltin
BY
McLaughlin + Wallenstein
Attys.

Sept. 23, 1952  B. ABOLTIN  2,611,723
FILM SPLICER
Filed Dec. 13, 1949  2 SHEETS—SHEET 2
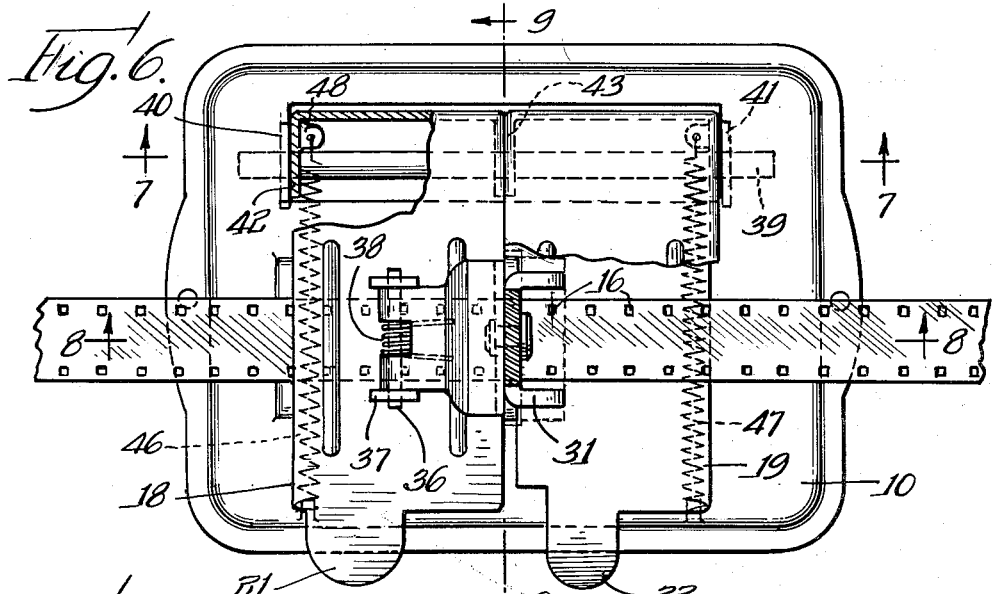
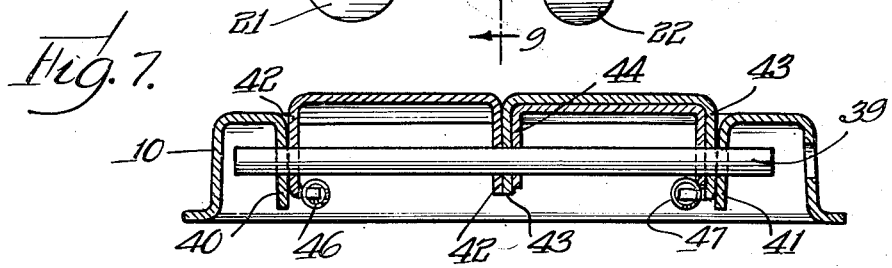
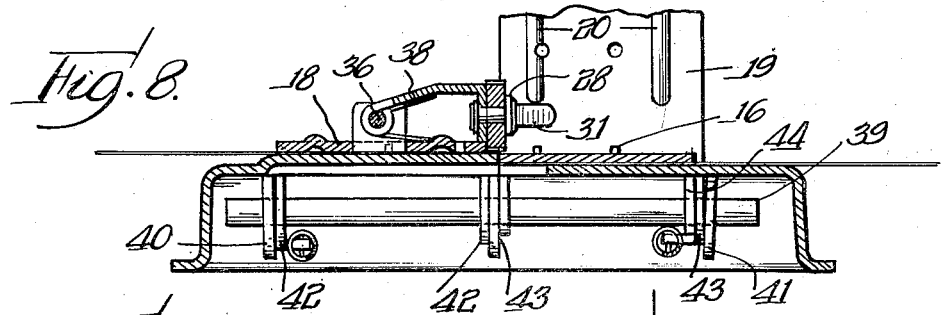
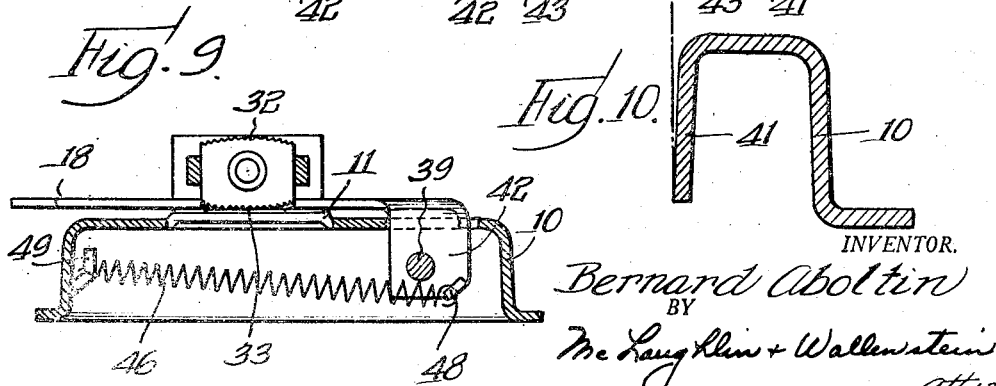
INVENTOR.
Bernard Aboltin
BY
McLaughlin & Wallenstein
Attys.

Patented Sept. 23, 1952

2,611,723

UNITED STATES PATENT OFFICE 2,611,723

FILM SPLICER

Bernard Aboltin, Chicago, Ill., assignor to Mansfield Industries, Inc., Chicago, Ill., a corporation of Illinois Application December 13, 1949, Serial No. 132,780

20 Claims. (Cl. 154—42.1)

My invention relates to improvements in film splicers for splicing together the cut ends of two pieces of film.

One object of my invention is to provide, in a film splicer, an improved form of scraping or abrading device for the purpose of removing the emulsion adjacent the edge of one section of film preparatory to carrying out the splicing operation.

Another object of my invention is the provision of an improved construction by means of which the simultaneous cutting of the two film ends is accomplished in a simple and sure manner.

The teachings of my invention may be considered in relation to that type of film splicer which includes a frame member providing a fixed base member on the left side of the frame member, a hinged base member on the right side of the frame member, hinged left and right film clamping plates which cooperate with the base members to form film holding assemblies, and means for scraping emulsion from adjacent one edge of a length of film. In such film splicers, the scrapers have taken various forms. Either they are separate and distinct devices or they are attached to the left hand clamping plate or in some other manner so that the scraping or abrading surface may be brought to bear against the film edge whereupon, by movement with the hand, the scraping operation is carried out. Typical of such constructions are those shown in U. S. Patents Nos. 1,550,038; 1,672,542; 2,126,298; 2,241,224; 2,257,182; 2,258,313; 2,385,353; and 2,457,995.

Generally speaking, in accordance with my invention, the film scraper is mounted on a support member, the latter being rigidly held preferably on the left clamping plate, and the scraper proper is adapted to be moved longitudinally of the support but, of course, transversely of the film strip. The scraper is also mounted so as to be readily movable about its axis. In its particularly preferred form, the scraper is provided with two oppositely arranged scraping or abrading surfaces of different abrading characteristics, and said surfaces are slightly curved longitudinally thereof. Finger pieces or the like are formed on the scraper between abrading surfaces to facilitate manipulation of the scraper. The construction serves to perform the scraping operation in excellent manner and with a minimum of effort, taking care of inequalities in emulsion thickness and the like and readily adapting itself to meet whatever problems may arise in relation to the removal of emulsion preparatory to the splicing operations.

My invention also embodies novel means whereby the simultaneous cutting of the two film ends is accomplished in a sure manner. Heretofore, it has been common practice, in film splicers of the type to which my invention relates, to utilize upstanding lugs on the base members so that when the hinged clamping plates are moved downwardly into clamping and cutting relation, as the case may be, they are urged inwardly to insure proper cutting action. In accordance with my invention, such upstanding lugs are unnecessary and the means for accomplishing the certainty of effective cutting are concealed and out of the way, all as is described in detail below in connection with the drawings wherein a particularly preferred embodiment of my invention is shown.

Fig. 1 is a perspective view of a preferred embodiment of a film splicer made in accordance with my invention, the clamping plates of the two film holding assemblies being in closed or latched position.

Fig. 2 is a perspective view in which the two hinged clamping plates and the hinged base plate are shown in raised position.

Fig. 3 is a transverse section taken along the line 3—3 of Fig. 1, looking in the direction of the arrows.

Fig. 4 is an exploded perspective view showing the scraper support member and the scraper adapted to be mounted thereon.

Fig. 5 is a perspective view of the latch member for holding the film holding assemblies in closed or latched position.

Fig. 6 is a plan view, partly in section, with the clamping plates omitted, for clarity purposes.

Fig. 7 is a longitudinal section taken along the line 7—7 of Fig. 6, looking in the direction of the arrows.

Fig. 8 is a longitudinal section taken along the line 8—8 of Fig. 6, looking in the direction of the arrows.

Fig. 9 is a transverse section taken along the line 9—9 of Fig. 6, looking in the direction of the arrows.

Fig. 10 is an enlarged section showing the angularity of one of the frame ears against which an outer ear of a clamping plate abuts for the purpose described hereafter.

The film splicer comprises a base member 10 having a slightly raised fixed base plate 11 arranged at the left side of the base member, and a pivoted base plate 12 arranged at the right side of the base member. Adjacent the base plate 11 is a slotted or cut out portion 13. The upper surfaces of said base plate members are provided with the usual projections 14, 16 which engage in the side perforations of the film to hold it in place. The plate 12 is provided with a finger piece 17 for facilitating lowering and raising said plate as may be required.

Associated with each base plate is a pivoted clamping plate, the left clamping plate being denoted by numeral 18 and the right clamping plate by numeral 19. The plates 18 and 19 are each provided with spaced ribs 20 to impart rigidity and enhanced tensile strength to said plates. The plate 18 has a finger piece 21 and the plate 19 has a finger piece 22. The manner in which the pivoting or hinging of the plates 12, 18 and 19 is effected is described in detail below.

Mounted on the upper surface of the clamping plate 18 is the film scraper mechanism. This comprises a support member 23 having a right angular portion 24 provided with a longitudinal slot 26 within which a film scraper 27 is adapted to be moved freely. A rivet or the like 28 having enlarged heads extends through an aperture 29 in the scraper 27 and loosely through the slot 26 so that the scraper is movable freely along the slot 26 and, in addition, is adapted for movement about its axis. The scraper is generally U-shaped and is provided with finger pieces or extensions 31 for easy manual manipulation. The scraper 27 has opposed film abrading surfaces 32 and 33 each of which is provided with a slight curvature. It is desirable that these abrading surfaces be of different degrees of fineness. It will be seen that either abrading surface may be used and the scraper may be turned with the hand to different angularities so that the film emulsion may be scraped off in a facile manner and without any danger of tearing the side edges of the film. The end of the scraper support member remote from the right angle portion 24 is formed with spaced hinges 34 through which pass a transverse rod 36 which is supported rigidly in alined apertures provided in ears 37 extending upwardly from the clamping plate 18. A coil spring 38 is mounted around the transverse rod 36 between the hinges 34 and one free end of the spring 38 bears against the support member 23 and the other free end of said spring bears against the top of clamping plate 18. It will be seen, therefore, that the scraper is normally urged towards the left and away from scraping position. With the film to be spliced clamped within the film holding assembly formed by plates 11 and 18, and the film holding assembly formed by the plates 12 and 19 in raised position and out of the way, the finger pieces are grasped between the fingers and moved to the right on the hinges 34 to scraping position. It will be observed that the scraper support member is rigid or fixed and only the film scraper proper is moved transversely of the film, and the scraper is freely and easily movable and not against the resistance of any spring. This is in sharp contrast, for example, to various prior art constructions wherein the scraper and its entire support member are moved during a scraping operation and against the resistance of a spring.

As is shown more particularly in Figs. 2, 3, 6, 7 and 8, the base plate 12 and both clamping plates 18 and 19 are hinged along their rear portions on a longitudinally extending shaft or rod 39 which is most advantageously mounted below the plane of the base plates. Spaced ears 40 and 41 extending downwardly from said frame and advantageously integral therewith are provided with apertures which are alined with apertures extending through pairs of spaced ears 42, 43 and 44 extending, respectively, from plates 18, 19 and 12 and essentially at a right angle to said plates. The shaft 39 passes through all of said alined apertures. It will be noted that each outer ear 42, 43 is disposed inwardly of but in abutting relation to its respective frame ear 41, the inner ears 42, 43 are in juxtaposition to each other, and the ears 44 of the hinged base plate 12 are disposed between the ears 43 of the clamping plate 19 and in juxtaposition to said ears 43. Individual coil springs 46 and 47 extend transversely of the base, each coil spring being attached at one of its ends to an inturned extension 48 through an aperture therein, and the other free end of each said coil springs is attached to a hook-like member 49, preferably struck rearwardly from the front of the frame 10. The tension of these coil springs is normally to urge the plates 18 and 19 upwardly.

As shown in Figs. 7 and 8, and particularly in Fig. 10 in enlarged form, the frame ear 41 extends at an inward angle not more than a few degrees away from a right angle in relation to the axis of the shaft 39. An angle of less than 2 degrees, preferably approximately 1.5 to 1.7 degrees, away from a right angle is quite satisfactory. By virtue of this construction, it will be seen that when the right film holding assembly is moved downwardly to effect a cutting and splicing of the film, said film assembly is urged very slightly to the left and thereby definitely insures severing of the film ends. In various types of prior art constructions, the resistance offered by the film tends to move the right film holding assembly towards the right with the result that the film frequently is not cut but is only bent. In my construction, bending of the film cannot occur and cutting of the film ends is rendered easy and certain.

At the front of the splicer, a latch means is provided for holding down firmly the hinged plates after a cutting and splicing operation has been carried out and during the time necessary for the cement to dry. The latch means, best shown in Figs. 3 and 5, comprises a vertical portion 51, a horizontal portion 52, latching tabs 53, and a finger piece 54. Said latch means is spring-mounted and is attached to the front of the frame member 10 by means of a bolt 56 which extends through an aperture 57 in the latch means and an alined aperture in said frame member 10. A coil spring 58 normally under compression encircles the bolt 56 and is held between a nut 59, threaded onto the end of the bolt, and the frame member 10. The horizontal portion 52 extends through a slot 61 in the front of the frame member 10. It will be seen, therefore, that the latching tabs 53 hold the hinged plates down firmly, as previously indicated; and when, after the cement has set, it is desired to open the plates 18 and 19, depressing the finger piece 54 will move the latching tabs 53 out of contact with the plates 18 and 19 and the springs 46 and 47 will cause the plates 18 and 19 to spring upwardly.

The manner of use of the splicer of my present invention is believed clear and no further description is deemed necessary.

While the invention has been described in detail, no unnecessary limitations should be read thereinto, the scope of said invention being set out in the appended claims.

What I claim as new and desire to protect by Letters Patent of the United States is:

1. In a film splicer which includes a pair of film holding assemblies each of which includes a base plate and a clamping plate, a film scraping support member, and a film scraper mounted for longitudinal movement along said support member, said scraper also being adapted for movement in its longitudinal plane about an axis transverse to said plane.

2. In a film splicer which includes a pair of film holding assemblies each of which includes a base plate and a clamping plate, a film scraping support member, said support member including a slot arranged transversely of the film when the latter is held in position for splicing, and a film scraper mounted freely within said slot for longitudinal movement in its longitudinal plane therein, said scraper also being adapted for movement about an axis transverse to said plane.

3. In a film splicer which includes a pair of film holding assemblies each of which includes a base plate and a clamping plate, a film scraping support member fixedly mounted on one of said clamping plates, and a film scraper mounted for longitudinal movement on said support member, said scraper also being adapted for movement in its longitudinal plane about an axis transverse to said plane.

4. In a film splicer which includes a pair of film holding assemblies each of which includes a base plate and a clamping plate, a film scraping support member fixedly mounted on one of said clamping plates, said support member including a slot arranged transversely of the film when the latter is held in position for splicing, and a film scraper mounted freely within said slot for longitudinal movement therein.

5. In a film splicer which includes a pair of film holding assemblies each of which includes a base plate and a clamping plate, a film scraping support member fixedly mounted on one of said clamping plates, said support member including a slot arranged transversely of the film when the latter is held in position for splicing, and a film scraper mounted freely within said slot for longitudinal movement therein, said scraper also being adapted for movement in its longitudinal plane about an axis transverse to said plane.

6. In a film splicer which includes a pair of film holding assemblies each of which includes a base plate and a clamping plate, a film scraping support member, and a film scraper mounted for longitudinal movement along said support member and also being adapted for movement in its longitudinal plane about an axis transverse to said plane, said film scraper having a scraping surface which is slightly curved longitudinally thereof.

7. In a film splicer which includes a pair of film holding assemblies each of which includes a base plate and a clamping plate, a film scraping support member fixedly mounted on one of said clamping plates, said support member including a slot arranged transversely of the film when the latter is held in position for splicing, and a film scraper mounted freely within said slot for longitudinal movement therein and also being adapted for movement in its longitudinal plane about an axis transverse to said plane, said film scraper having oppositely disposed scraping surfaces each of which is of a different degree of abrading character and each of which is slightly curved longitudinally thereof.

8. In a film splicer which includes a pair of film holding assemblies each of which includes a base plate and a clamping plate, a film scraping support member fixedly mounted on one of said clamping plates, said support member including a slot arranged transversely of the film when the latter is held in position for splicing, and a film scraper mounted freely within said slot for longitudinal movement therein, said film scraper having at least one scraping surface which is slightly curved longitudinally thereof.

9. In a film splicer which includes a pair of film holding assemblies each of which includes a base plate and a clamping plate, a film scraping support member fixedly mounted on one of said clamping plates, said support member including a slot arranged transversely of the film when the latter is held in position for splicing, and a film scraper mounted freely within said slot for longitudinal movement therein and also being adapted for movement in its longitudinal plane about an axis transverse to said plane, said film scraper having oppositely disposed scraping surfaces.

10. In a film splicer which includes means for holding film in position for splicing, a film scraping support member, and a film scraper mounted for longitudinal movement along said support member, said scraper also being adapted for movement in its longitudinal plane about an axis transverse to said plane.

11. In a film splicer which includes means for holding film in position for splicing, a film scraping support member, and a film scraper mounted for longitudinal movement along said support member, said scraper also being adapted for movement in its longitudinal plane about an axis transverse to said plane, said scraper having at least one scraping surface which is slightly curved longitudinally thereof.

12. In a film splicer which includes a pair of film holding assemblies each of which includes a base plate and a clamping plate, a film scraping support member fixedly mounted on one of said clamping plates, said support member including a slot arranged transversely of the film when the latter is held in position for splicing, and a film scraper mounted freely within said slot for longitudinal movement therein and also being adapted for movement in its longitudinal plane about an axis transverse to said plane, said film scraper having oppositely disposed scraping surfaces each of which is slightly curved longitudinally thereof.

13. A scraper unit for use on a film splicer, said unit comprising a film scraping support member, and a film scraper mounted freely for longitudinal movement thereon, said scraper also being adapted for movement in its longitudinal plane about an axis transverse to said plane.

14. A scraper unit for use on a film splicer, said unit comprising a film scraping support member, and a film scraper mounted freely for longitudinal movement thereon and also being adapted for movement in its longitudinal plane about an axis transverse to said plane, said film scraper having at least one scraping surface which is slightly curved longitudinally thereof.

15. A scraper unit for use on a film splicer, said unit comprising a film scraping support member, said support member including a longitudinal slot, and a film scraper mounted freely within said slot for longitudinal movement therein, said scraper also being adapted for movement in its longitudinal plane about an axis transverse to said plane.

16. A scraper unit for use on a film splicer said unit comprising a film scraping support member, said support member including a longitudinal slot, and a film scraper mounted freely within said slot for longitudinal movement therein and also being adapted for movement in its longitudinal plane about an axis transverse to said plane, said film scraper having at least one scraping surface which is slightly curved longitudinally thereof.

17. In that type of film splicer which includes a frame, a pair of film holding assemblies each of which includes a base plate and a clamping plate, one of said base plates and both of said clamping plates being hinged along their rear portions on a longitudinally extending shaft, a pair of spaced ears integrally attached to said frame, pairs of spaced ears extending from each of said clamping plates and also from said hinged base plate, all of said clamping plate and hinged base plate ears being bent at essentially a right angle in relation to said plates and all of said ears having alined apertures through which said shaft passes, each outer ear of said clamping plates ears being disposed inwardly of but in abutting relation to its respective frame ear, the improvement wherein the frame ear adjacent said assembly of the hinged base and hinged clamping plate extending at an inward angle not more than a few degrees away from a right angle in relation to the axis of said shaft.

18. A film splicer in accordance with claim 17, wherein the inward angle is approximately 1.5 to 1.7 degrees away from a right angle in relation to the axis of the shaft.

19. In that type of film splicer which includes a frame, a left and right film holding assemblies, the left film holding assembly including a fixed base plate and a hinged clamping plate, the right film holding assembly including a hinged base plate and a hinged clamping plate, the hinged plates being hinged along their rear portions on a longitudinally extending shaft, left and right spaced ears integrally attached to said frame, pairs of spaced ears extending from each of said clamping plates and also from said hinged base plate, all of said clamping plate and hinged base plate ears being bent at essentially a right angle in relation to said plates and all of said ears having alined apertures through which said shaft passes, each outer ear of said clamping plates ears being disposed inwardly of but in abutting relation to its respective frame ear, the improvement wherein the right frame ear extends downwardly from said frame and at an inward angle less than 2 degrees away from a right angle in relation to the axis of said shaft.

20. In that type of film splicer which includes a frame, left and right film holding assemblies, the left film holding assembly including a fixed base plate and a hinged clamping plate, the right film holding assembly including a hinged base plate and a hinged clamping plate, the hinged plates being hinged along their rear portions on a longitudinally extending shaft, left and right spaced ears integrally attached to said frame, pairs of spaced ears downwardly extending from each of said clamping plates and also from said hinged base plate, all of said clamping plate and hinged base plate ears being bent at essentially a right angle in relation to said plates and all of said ears having alined apertures through which said shaft passes, each outer ear of said clamping plates ears being disposed inwardly of but in operatively abutting relation to its respective frame ear, the inner ears of said clamping plates being in juxtaposition to each other, the ears of said hinged base plate being disposed between the ears of one of said clamping plates and in juxtaposition thereto respectively, the improvement wherein the frame ear extends from said frame and at an inward angle not more than 2 degrees away from a right angle in relation to the axis of said shaft.

BERNARD ABOLTIN.

REFERENCES CITED

The following references are of record in the file of this patent:

UNITED STATES PATENTS

| Number | Name | Date |
|---|---|---|
| 1,088,478 | Stow | Feb. 24, 1914 |
| 1,466,076 | Van Pelt | Aug. 28, 1923 |
| 2,385,353 | Frankel | Sept. 25, 1945 |
| 2,457,995 | Frankel | Jan. 4, 1949 |
| 2,495,957 | Corsaw | Jan. 31, 1950 |